United States Patent
Yang

(10) Patent No.: US 11,947,429 B2
(45) Date of Patent: Apr. 2, 2024

(54) DATA DISASTER RECOVERY METHOD AND SITE

(71) Applicant: HUAWEI TECHNOLOGIES CO., LTD., Shenzhen (CN)

(72) Inventor: Wenjun Yang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 464 days.

(21) Appl. No.: 17/211,906

(22) Filed: Mar. 25, 2021

(65) Prior Publication Data

US 2021/0208982 A1 Jul. 8, 2021

Related U.S. Application Data

(63) Continuation of application No. PCT/CN2019/107620, filed on Sep. 25, 2019.

(30) Foreign Application Priority Data

Sep. 26, 2018 (CN) .......................... 201811125060.0

(51) Int. Cl.
*G06F 11/14* (2006.01)

(52) U.S. Cl.
CPC ...... *G06F 11/1469* (2013.01); *G06F 11/1451* (2013.01); *G06F 11/1464* (2013.01); *G06F 11/1484* (2013.01); *G06F 2201/84* (2013.01)

(58) Field of Classification Search
CPC ............. G06F 11/1469; G06F 11/1451; G06F 11/1464; G06F 11/1484; G06F 2201/84
See application file for complete search history.

(56) References Cited

U.S. PATENT DOCUMENTS

| 9,619,172 | B1 | 4/2017 | Natanzon et al. |
| 10,496,487 | B1 * | 12/2019 | Natanzon ............ G06F 11/1451 |
| 2007/0094467 | A1 | 4/2007 | Yamasaki |

(Continued)

FOREIGN PATENT DOCUMENTS

| CN | 101635638 A | 1/2010 |
| CN | 105487940 A | 4/2016 |

(Continued)

OTHER PUBLICATIONS

Xiong, Huanhuan, Frank Fowley, and Claus Pahl. "An architecture pattern for multi-cloud high availability and disaster recovery." Workshop on Federated Cloud Networking FedCloudNet. vol. 2015. 2015. (Year: 2015).*

(Continued)

*Primary Examiner* — Nicholas J Simonetti
(74) *Attorney, Agent, or Firm* — Rimon PC

(57) ABSTRACT

A data disaster recovery method performed by a disaster recovery site includes: selecting a first backup copy when taking over a service of a production site; receiving service data through a virtual machine; obtaining changed block tracking CBT) information based on a CBT technology and the received service data, where the CBT information includes incremental information generated after the disaster recovery site receives the first backup copy; and sending, by the disaster recovery site, a first message to the production site, where the first message includes the CBT information.

6 Claims, 6 Drawing Sheets

(56) References Cited

U.S. PATENT DOCUMENTS

| | | | |
|---|---|---|---|
| 2014/0136803 A1* | 5/2014 | Qin | G06F 11/1458 |
| | | | 711/162 |
| 2015/0234717 A1* | 8/2015 | Fang | G06F 11/1464 |
| | | | 714/19 |
| 2016/0048408 A1 | 2/2016 | Madhu et al. | |
| 2016/0147614 A1 | 5/2016 | Mittal et al. | |
| 2016/0292250 A1* | 10/2016 | Chen | G06F 16/273 |
| 2017/0004047 A1* | 1/2017 | Deshmukh | G06F 11/1448 |
| 2017/0220427 A1* | 8/2017 | Fu | G06F 11/1469 |
| 2017/0235754 A1* | 8/2017 | Zhong | G06F 16/1752 |
| | | | 707/649 |
| 2018/0059973 A1 | 3/2018 | Jain et al. | |

FOREIGN PATENT DOCUMENTS

| | | |
|---|---|---|
| CN | 106445735 A | 2/2017 |
| CN | 108255641 A | 7/2018 |
| CN | 108512693 A | 9/2018 |
| CN | 109491832 A | 3/2019 |
| WO | 2018023994 A1 | 2/2018 |

OTHER PUBLICATIONS

El-Qasem, Hani. "Virtual Backup Strategies: Using Storage Snapshots for Backups." Aug. 2013 (Year: 2013).*

Hongliang Yu et al., "Birds: A Bare-Metal Recovery System for Instant Restoration of Data Services", IEEE Transactions on Computers, vol. 63, No. 6, Jun. 2014, total 16 pages.

* cited by examiner

DATA DISASTER RECOVERY METHOD AND SITE

CROSS-REFERENCE TO RELATED APPLICATIONS

This application is a continuation of International Application No. PCT/CN2019/107620, filed on Sep. 25, 2019, which claims priority to Chinese Patent Application No. 201811125060.0, filed on Sep. 26, 2018. The disclosures of the aforementioned applications are hereby incorporated by reference in their entireties.

TECHNICAL FIELD

This application relates to the field of information processing, and in particular, to a data disaster recovery method and a site.

BACKGROUND

Data disaster recovery is one of hot topics in construction of an information data center. Generally, a production site needs to send a data backup to a disaster recovery site when the production site runs normally. In this way, the disaster recovery site can take over a service of the production site when the production site is faulty. When a fault of the production site is rectified, data is synchronized from the disaster recovery site to the production site to restore the service.

In a heterogeneous scenario, a full data synchronization solution is usually used for data synchronization from the disaster recovery site to the production site. However, full data synchronization causes transmission of a large amount of data between the disaster recovery site and the production site. This occupies a relatively large amount of bandwidth and affects a recovery time objective (RTO).

SUMMARY

This application provides a data disaster recovery method and a site, to reduce an amount of data to be synchronized from a disaster recovery site to a production site in a disaster recovery process.

According to a first aspect, a data disaster recovery method is provided. The disaster recovery system includes a production site and a disaster recovery site, and the method includes: selecting, by the disaster recovery site, a first backup copy when taking over a service of the production site; receiving, by the disaster recovery site, service data through a virtual machine; obtaining, by the disaster recovery site, changed block tracking CBT) information based on a CBT technology and the received service data, where the CBT information includes incremental information generated after the disaster recovery site receives the first backup copy; and sending, by the disaster recovery site, a first message to the production site, where the first message includes the CBT information. A storage server in the disaster recovery site and a storage server in the production site are heterogeneous devices.

During a disaster recovery process, the disaster recovery site generates the incremental information generated since the disaster recovery site takes over the service of the production site based on the CBT technology. Compared with a full backup manner, this method can decrease a data amount, reduce occupied transmission bandwidth, reduce an RTO, and improve user experience.

It should be understood that the disaster recovery site may include a plurality of servers. The plurality of servers include the storage server of the disaster recovery site, a backup server, a server of another type, and the like. The production site may include a production host, a backup server, and the storage server. This is not specifically limited in this application.

It should be understood that the disaster recovery site may take over the service of the production site when the entire production site is faulty, or may take over the service of the production site when the host of the production site is faulty. This is not specifically limited in this embodiment of this application.

With reference to the first aspect, in some implementations of the first aspect, the obtaining, by the disaster recovery site, CBT information based on a changed block tracking CBT) technology and the received service data includes: generating, by the disaster recovery site, N snapshots, where N is greater than or equal to 2; and obtaining, by the disaster recovery site, difference information between each of the N snapshots and a previous snapshot of each of the N snapshots, where the CBT information includes the difference information.

The snapshot is generated quickly and occupies small space. A snapshot-based CBT technology can improve a backup speed and further reduce the RTO.

With reference to the first aspect, in some implementations of the first aspect, the CBT information includes CBT corresponding to each of the N snapshots, the $N^{th}$ snapshot corresponds to $N^{th}$ CBT, and the $N^{th}$ CBT includes difference information between each of the first N−1 snapshots and a previous snapshot of each of the first N−1 snapshots.

A corresponding CBT format in the foregoing technical solution can increase a proportion of a useful data block in CBT, and further reduce an amount of data to be synchronized from the disaster recovery site to the production site.

With reference to the first aspect, in some implementations of the first aspect, after the obtaining, by the disaster recovery site, difference information between each of the N snapshots and a previous snapshot of each of the N snapshots, the method further includes: deleting, by the disaster recovery site, the first N−1 snapshots, and retaining the $N^{th}$ snapshot.

In the foregoing technical solution, after completing backup, the disaster recovery site delete the snapshots, to save specific storage space and optimize service performance of the disaster recovery site.

The last retained snapshot can be directly used as a basis for subsequent backup. This reduces time for generating a snapshot.

According to a second aspect, a data disaster recovery method is provided, including: sending, by a production site, a first backup copy to a disaster recovery site, so that the disaster recovery site takes over a service of the production site; receiving, by the production site, a first message sent by the disaster recovery site, where the first message includes CBT information, and the CBT information includes incremental information generated since the disaster recovery site takes over the service of the production site; and recovering, by the production site, the service based on the first backup copy and the CBT information.

Optionally, the production site generates a plurality of backup copies, and stores the plurality of backup copies in a local storage server.

It should be understood that the plurality of backup copies are stored in the local server, and the plurality of backup copies are sent to the disaster recovery site, so that the disaster recovery site and the production site have a same backup data link. This facilitates incremental backup. A disaster recovery process can be completed when the production host in the production site is faulty.

With reference to the second aspect, in some possible implementations, the CBT information includes N CBT, where N is greater than or equal to 2, and the method further includes: determining, by the production site, a difference between the CBT; and recovering, by the production site, the service based on the first backup copy and the difference between the CBT.

In the foregoing technical solution, the production site can quickly restore the service based on a difference between different CBT.

According to a third aspect, a disaster recovery site is provided, including: a selection module, configured to select a first backup copy when taking over a service of a production site; a receiving module, configured to receive service data through a virtual machine; an obtaining module, configured to obtain changed block tracking CBT) information based on a CBT technology and the received service data, where the CBT information includes incremental information generated after the disaster recovery site receives the first backup copy; and a sending module, configured to send a first message to the production site, where the first message includes the CBT information. A storage server in the disaster recovery site and a storage server in the production site are heterogeneous devices.

With reference to the third aspect, in some possible implementations, the disaster recovery site further includes a generation module, configured to generate N snapshots, where N is greater than or equal to 2; and the obtaining module is configured to obtain difference information between each of the N snapshots and a previous snapshot of each of the N snapshots, where the CBT information includes the difference information.

With reference to the third aspect, in some possible implementations, the CBT information includes CBT corresponding to each of the N snapshots, the $N^{th}$ snapshot corresponds to $N^{th}$ CBT, and the $N^{th}$ CBT includes difference information between each of the first N−1 snapshots and a previous snapshot of each of the first N−1 snapshots.

With reference to the third aspect, in some possible implementations, the obtaining module is further configured to delete the first N−1 snapshots and retain the $N^{th}$ snapshot.

According to a fourth aspect, a production site is provided, including: a sending module, configured to send a first backup copy to a disaster recovery site, so that the disaster recovery site takes over a service of the production site; a receiving module, configured to receive a first message sent by the disaster recovery site, where the first message includes CBT information, and the CBT information includes incremental information generated since the disaster recovery site takes over the service of the production site; and a recovery module, configured to restore the service based on the first backup copy and the CBT information.

With reference to the fourth aspect, in some possible implementations, the CBT information includes N CBT, N is greater than or equal to 1. The production site further includes an obtaining module, and the obtaining module is further configured to obtain a difference between the CBT. The recovery module is further configured to restore the service based on the first backup copy and the difference between backups.

According to a fifth aspect, a computer-readable medium is provided and is configured to store a computer program. The computer program includes an instruction for performing the method according to any possible implementation of any one of the foregoing aspects.

According to a sixth aspect, a chip is provided. The chip stores an instruction, and when the instruction is run on a computer device, the communications device is enabled to perform the method according to any possible implementation of any one of the foregoing aspects.

DESCRIPTION OF EMBODIMENTS

Data disaster recovery is one of hot topics in construction of an information data center. Generally, a production site needs to send a data backup to a disaster recovery site when the production site runs normally. In this way, the disaster recovery site can take over a service of the production site when the production site is faulty.

To restore the service, data needs to be synchronized from the disaster recovery site to the production site when a fault of the production site is rectified. In a homogeneous scenario, a storage server in the production site and a storage server in the disaster recovery site are from a same vendor. Therefore, an array-based replication technology may be used to synchronize incremental data generated since the disaster recovery site takes over the service of the production site. During synchronization of the incremental data, a small amount of data is to be transmitted, a small amount of transmission bandwidth is occupied, and a corresponding RTO is relatively short. However, in a heterogeneous scenario, because a storage device in the production site and a storage device in the disaster recovery site are from different vendors, full data (or a full backup) generated since the disaster recovery site takes over the service needs to be synchronized to the production site. During full data synchronization, a large amount of data is to be transmitted, a large amount of bandwidth is occupied, and an RTO is affected.

Figure 1:
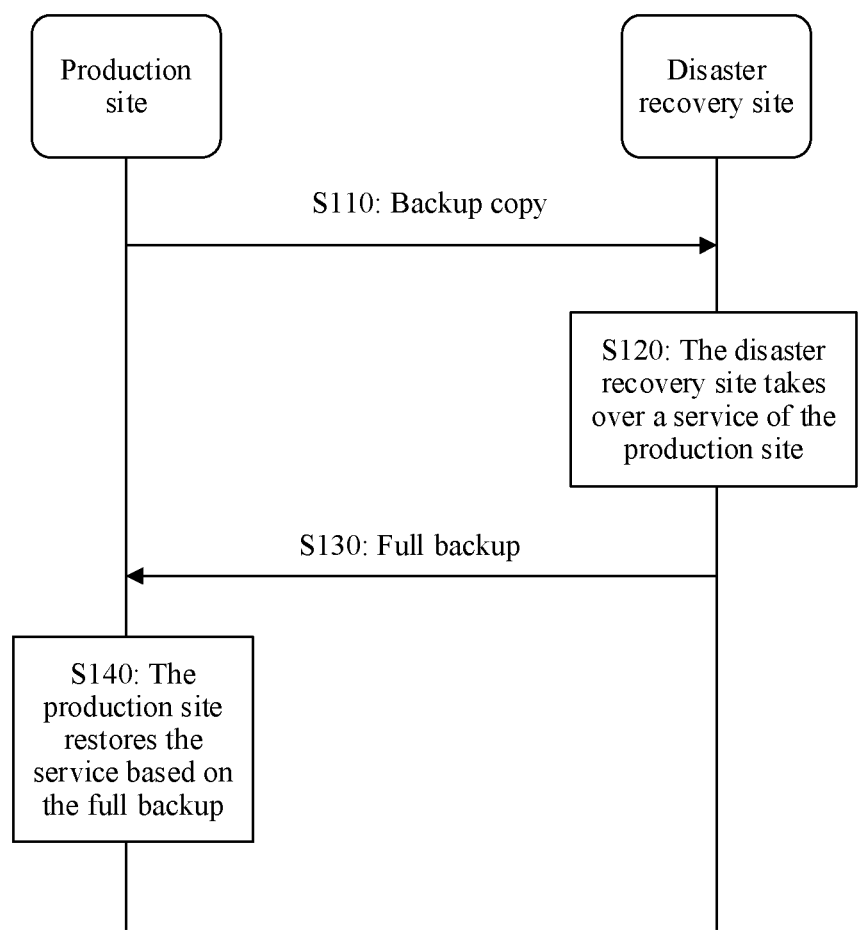
FIG. 1 is a schematic flowchart of a data disaster recovery method in a heterogeneous scenario.

For ease of understanding, the following describes, with reference to FIG. 1, a data disaster recovery method implemented through full backup synchronization in a heterogeneous scenario. FIG. 1 is a schematic diagram of a data disaster recovery method in a heterogeneous scenario according to an embodiment of this application.

A data disaster recovery method in which a disaster recovery site synchronizes full data to a production site in a heterogeneous scenario is described by using an example in which the production site is a user DC, and the disaster recovery site is a site including a plurality of servers. The production site may include a production host, a backup server, a storage server, and the like. The production host is configured to process a service of the production site. The storage server is configured to provide a storage service for the production site. Backup software is installed on the backup server, and the backup server is configured to back up data of the production host and synchronize the data to the disaster recovery site. Alternatively, the backup server reads data from the storage server and sends the data to the disaster recovery site. The plurality of servers constituting the disaster recovery site may be logically divided into a first set and a second set. The first set is used to provide a computing resource, and the second set is used to provide a storage resource. The storage server in the production site and a storage server in the disaster recovery site are heterogeneous.

As shown in FIG. 1, in step S110, the production site sends a backup copy to the disaster recovery site when the production site runs normally, and the disaster recovery site stores the backup copy in the storage server.

When the production site runs normally, the production host in the production site processes a user-related service. To implement data disaster recovery, the backup server further needs to back up the data of the production host, and send the backup data to the disaster recovery site. The disaster recovery site stores the backup copy in a storage server in the second set used to provide the storage resource.

In step S120, when the production site is faulty, the disaster recovery site resumes a virtual machine based on the backup copy received in step S110, and takes over the service of the production site through the recovered virtual machine.

In step 130, when a fault of the production site is rectified, the disaster recovery site sends a data backup to the production site, where the data backup is a full backup, and the full backup not only includes data newly generated after the disaster recovery site takes over the service of the production site, but also includes the original data of the production site. The production site performs disaster recovery based on the received full backup.

The storage server in the production site and the storage device in the disaster recovery site are heterogeneous. Therefore, the disaster recovery site needs to send the full backup to the production host in the production site, so that the production host can resume production based on the full backup. However, full data transmission increases an amount of data to be synchronized to the production site, and increases occupied transmission bandwidth and an RTO.

To reduce the amount of data to be synchronized from the disaster recovery site to the production site in a disaster recovery process, an embodiment of this application provides a data disaster recovery method in a heterogeneous scenario. Compared with the prior art in which a disaster recovery site transmits, in a disaster recovery process, full data to a production site in a heterogeneous scenario to restore a service of the production site, in this application, incremental data is transmitted. This reduces an amount of data to be synchronized from the disaster recovery site to the production site in the disaster recovery process, reduces occupied transmission bandwidth, and reduces an RTO.

Figure 2:
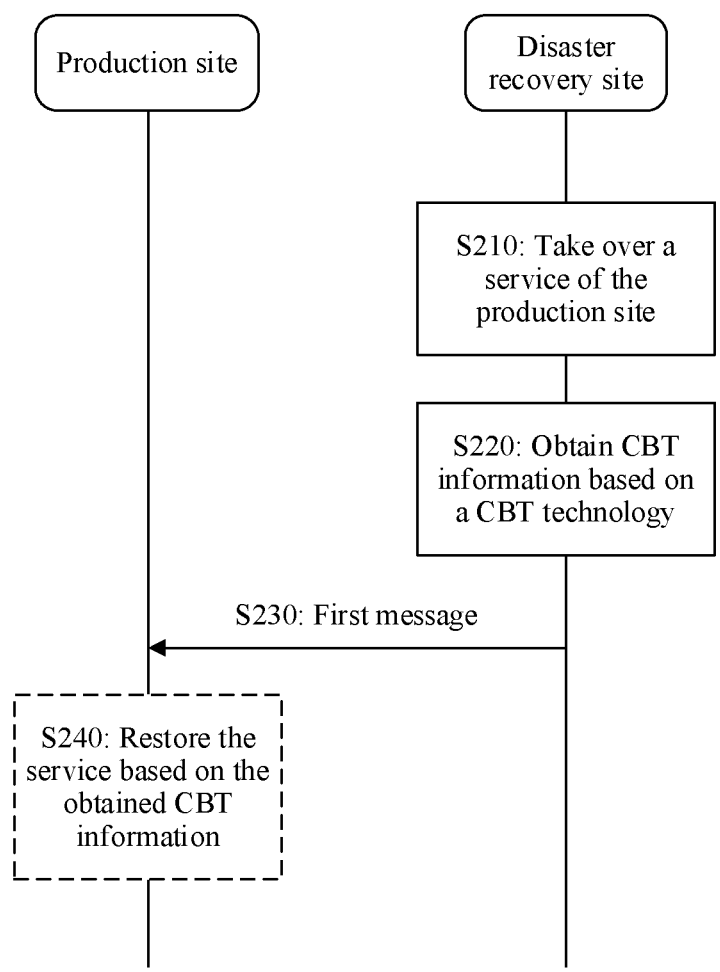
FIG. 2 is a schematic flowchart of a data disaster recovery method in a heterogeneous scenario according to an embodiment of this application.

The following describes the data disaster recovery method provided in this embodiment of this application with reference to the accompanying drawing. FIG. 2 is a schematic flowchart of a data disaster recovery method according to an embodiment of this application.

As shown in FIG. 2, in step S210, a disaster recovery site takes over a service of a production site.

The disaster recovery site and production site each may be a site including a plurality of servers. Alternatively, the disaster recovery site includes a plurality of servers, and the production site is a user IDC. Alternatively, the disaster recovery site may be a user IDC, and the production site may be a server of an enterprise. This is not specifically limited in this embodiment of this application.

The disaster recovery site selects a first backup copy when taking over the service of the production site. The first backup copy may be any backup copy sent to the disaster recovery site before the production site is faulty. In an example, the first backup copy may be a last backup copy generated by the production site before the production site is faulty.

The first backup copy may be generated by the production site through backup software, and stored in a storage server in the production site. When the production site is in a normal running status, the production site may send the first backup copy to the disaster recovery site, so that the disaster recovery site and the production site have a same backup data link. This facilitates incremental backup in a disaster recovery process.

The disaster recovery site may resume an operation of a virtual machine based on the first backup copy, and take over the service of the production site through the virtual machine, so that the service of the production site is not affected when the production site is faulty.

Optionally, before taking over the service of the production site, the disaster recovery site may sense whether the production site is faulty.

Specifically, when a production host in the production site is faulty, another server of the production site notifies the disaster recovery site that the production site is faulty. Alternatively, when the entire production site is faulty, a third-party site notifies the disaster recovery site when detecting that the production site is faulty or requires scheduled switchover. Alternatively, the disaster recovery site may directly perform a disaster recovery operation when detecting that the production site is faulty. This is not specifically limited in this embodiment of this application.

In step S220, the disaster recovery site obtains CBT information based on a CBT technology and received service data, where the CBT information includes incremental information generated after the disaster recovery site receives the first backup copy.

When resuming the operation of the virtual machine based on the first backup copy, the disaster recovery site takes over the service of the production site through the virtual machine, and generates new service data, namely, the incremental information. The incremental information may also be understood as incremental information relative to the first backup copy. The disaster recovery site may obtain the CBT information based on the CBT technology, and the CBT information includes the incremental information generated since the disaster recovery site takes over the service. In other words, the disaster recovery site implements incremental backup based on the CBT technology.

Optionally, that the disaster recovery site obtains the CBT information based on the CBT technology includes: generating, by the disaster recovery site, N snapshots ( ), where N is greater than or equal to 2; obtaining, by the disaster recovery site, difference information between each of the N snapshots and a previous snapshot of each of the N snapshots, or difference information between two versions at different times of the production site; and storing the difference information in the CBT information.

The snapshot (also referred to as a storage snapshot) is an image of data at a time point. By comparing snapshots, a change of data may be obtained at a time point relative to another time point. Whether a data block is changed within a time period is determined through snapshot comparison based on the CBT technology, and the changed data block is marked or recorded.

It should be understood that a frequency and a time point at which the disaster recovery site generates a snapshot are not specifically limited in this embodiment of this application. For example, a first snapshot may be generated before the disaster recovery site resumes the operation of the virtual machine based on the first backup copy and the disaster recovery site takes over the service of the production site through the virtual machine. To be specific, the first snapshot is generated at a time point before new data is generated relative to a version corresponding to the first backup copy. Then, a snapshot may be generated at a fixed frequency. Alternatively, a user may decide to back up the disaster recovery site, and make the disaster recovery site generate a snapshot based on a user requirement.

It should be further understood that a type of the snapshot is not specifically limited in this embodiment of this application. For example, the snapshot may be a split mirror snapshot, a copy-on-write snapshot, a redirect-on-write snapshot, or the like.

The CBT information generated based on the snapshot based on the CBT technology may further be in a plurality of formats. For example, the CBT information may include CBT corresponding to each of the N snapshots, and the $N^{th}$ snapshot corresponds to $N^{th}$ CBT. The $N^{th}$ CBT includes difference information between each of the first N−1 snapshots and the first N−1 snapshots. Alternatively, the CBT information may include CBT corresponding to each of the N snapshots, and the $N^{th}$ snapshot corresponds to $N^{th}$ CBT. The $N^{th}$ CBT includes difference information between the $N^{th}$ snapshot and an $(N-1)^{th}$ snapshot. This is not specifically limited in this embodiment of this application.

In a structure of the CBT information, newly added information of current CBT is recorded based on previous CBT. This reduces used CBT block resources, increases a proportion of useful information in the CBT information, and reduces occupied bandwidth resources and storage resources.

Optionally, after completing incremental backup, the disaster recovery site may delete the first N−1 snapshots and retain the $N^{th}$ snapshot.

After completing backup, the production site and the disaster recovery site delete the snapshots, to save storage space and optimize service performance of the disaster recovery site. The last retained snapshot can be directly used as a basis for subsequent backup. This reduces time for generating a snapshot.

In step S230, the disaster recovery site sends a first message to the production site, where the first message includes the CBT information.

After a fault of the production site is rectified, in a process of synchronizing data from the disaster recovery site to the production site, compared with a conventional full data transmission manner, incremental data transmission can decrease an amount of data to be transmitted, reduce occupied bandwidth, and reduce an RTO.

Optionally, in step 240, after receiving the first message, the production site may restore the service based on the existing first backup copy and the CBT information in the received first message. The CBT information is the incremental information generated after the service is transferred to the disaster recovery site. The production site may restore the service based on the first backup copy and the CBT information. To be specific, the production site may recover, based on the backup obtained before the fault and the incremental data generated after the disaster recovery site takes over the service, the service after the fault.

Figure 3:
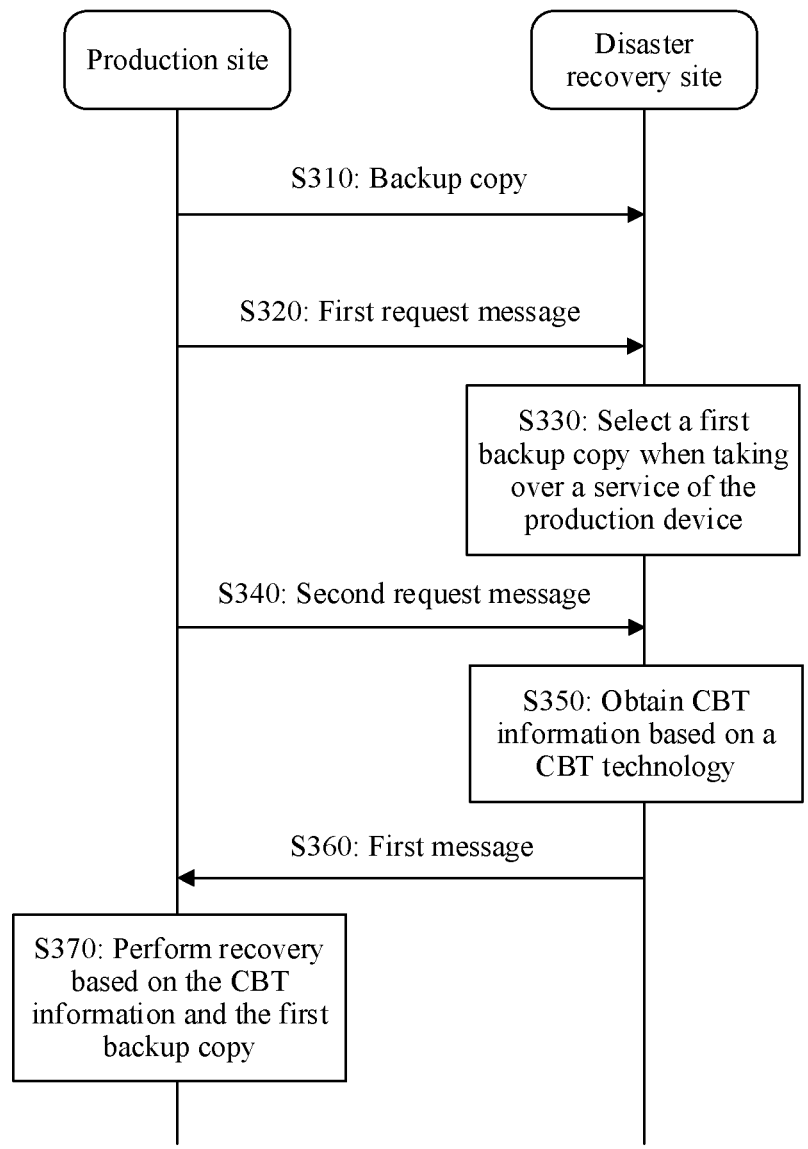
FIG. 3 is a schematic flowchart of another data disaster recovery method in a heterogeneous scenario according to an embodiment of this application.

For ease of understanding, the following describes in detail, with reference to FIG. 3, a solution of synchronizing incremental data from a disaster recovery site to a production site in a heterogeneous system. FIG. 3 is a schematic flowchart of synchronizing incremental data from a disaster recovery site to a production site in a heterogeneous scenario. The disaster recovery site and the production site in FIG. 3 constitute a heterogeneous system. The production site in FIG. 3 is a user IDC, and the disaster recovery site includes a plurality of servers. When the production site is the user IDC, the production site may include: a production host, configured to process a user-related service, a storage server, configured to provide a storage service for the production site, and a backup server, where backup software is installed on the backup server, and the backup server is configured to back up data of the production host. Alternatively, the backup server reads data from the storage server and sends the data to the disaster recovery site. The plurality of servers include a first set and a second set. The first set is used to provide a computing resource, and the second set is used to provide a storage resource. A storage device in the disaster recovery site and a storage device in the production site are heterogeneous devices.

It should be understood that the server in this embodiment of this application may be a server having an independent physical structure, or may be a software-based instance on the server. This is not specifically limited in this embodiment of this application.

The following describes in detail a data disaster recovery method provided in this embodiment of this application with reference to steps S310 to S370 shown in FIG. 3.

In step S310, the production site synchronizes a backup copy to the disaster recovery site.

The production site synchronizes the backup copy in the storage server to the disaster recovery site, and the disaster recovery site may store the received backup copy in any storage server in the second set. For example, the storage server may be a cloud object storage service (OSS).

The backup copy may be a backup copy generated by the production site in a normal running status. The production site may store the backup copy in the storage server of the production site.

In step 320, the production site sends a first request message to the disaster recovery site, to request the disaster recovery site to perform a disaster recovery switchover operation.

Specifically, when the production host in the production site is faulty, another server of the production site sends the first request message to the disaster recovery site, to request the disaster recovery site to perform the disaster recovery operation. Alternatively, when the entire production site is faulty, a third-party site notifies the disaster recovery site when detecting that the production site is faulty or requires scheduled switchover. Alternatively, the disaster recovery site may directly perform the disaster recovery operation when detecting that the production site is faulty. This is not specifically limited in this embodiment of this application.

In step 330, the disaster recovery site selects a first backup copy when taking over a service of the production site.

The first backup copy may be any one of backup copies related to the production site and the disaster recovery site, and different versions may be recovered based on different backup copies.

The disaster recovery site generates a virtual machine based on any one of the plurality of servers of the disaster recovery site. For example, the virtual machine may be a virtual machine generated based on a cloud server. The disaster recovery site takes over a service related to the production site through the virtual machine. Specifically, the disaster recovery site may run based on the first backup copy to take over the service related to the production site through the virtual machine.

Before the virtual machine takes over the service of the production site, in other words, before the disaster recovery site recovers a version corresponding to the first backup copy but does not generate new data, the disaster recovery site may generate a snapshot for the first time, that is, print the snapshot for the disaster recovery site for the first time. For ease of understanding, the snapshot generated at this time is referred to as a zero$^{th}$ snapshot.

After taking over the service of the production site, the disaster recovery site may generate snapshots, that is, generate a plurality of snapshots corresponding to different time. Content related to the snapshot has been described above, and details are not described herein again.

In step 340, the production site sends a second request message to the disaster recovery site. The second request message is used to notify the disaster recovery site that a fault of the production site is rectified, and request the disaster recovery site to perform a disaster recovery failback operation. The second request message may be sent by the production site after the fault of the production site is rectified, or may be sent by another third-party site after the another third-party site detects that the fault of the production site is rectified.

In step 350, the disaster recovery site obtains CBT information based on a CBT technology. The CBT message is incremental information. Specifically, the disaster recovery site compares snapshots printed for N times after step 330 to obtain the CBT information.

Figure 4:
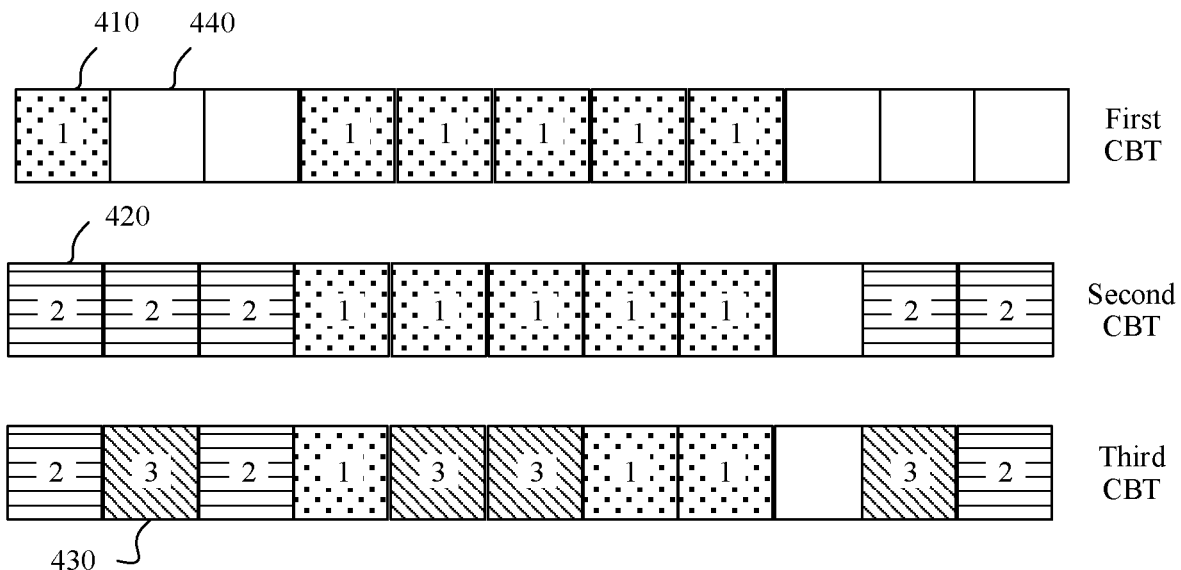
FIG. 4 is a schematic structural diagram of CBT information according to an embodiment of this application.

For ease of understanding, the following describes in detail a CBT information generation process with reference to FIG. 4.

It is assumed that the disaster recovery site prints snapshots for four times in total. For ease of understanding, the snapshots printed for four times are respectively referred to as the zero$^{th}$ snapshot to a third snapshot, where the zero$^{th}$ snapshot is a snapshot printed for the first time, and corresponds to the first backup copy. A first snapshot is a snapshot printed for the second time, and this method is also applied to a second snapshot and the third snapshot. Details are not described herein.

First CBT may be obtained by comparing the 0$^{th}$ snapshot with the first snapshot. FIG. 4 shows a structure of CBT information. A block 410 indicates a data block that changes during generation of the first snapshot relative to generation of the zeroth snapshot. "1" on the block 410 indicates an identifier of a backup copy corresponding to the first CBT. The backup copy herein may also be understood as a backup copy corresponding to the first snapshot. Alternatively, it may be understood that "1" may indicate a version number corresponding to a version based on which the disaster recovery site runs when generating the first snapshot. The block 410 may further include a recording unit, configured to record the identifier of the backup copy corresponding to the first CBT. A size of the recording unit is not specifically limited in this embodiment of this application. In an example, the recording unit may occupy four bytes or the like. A block 440 indicates a data block that does not change.

In the structure of the CBT information shown in FIG. 4, newly added information is recorded based on previous CBT. This reduces used CBT block resources, increases a proportion of useful information in the CBT information, and reduces occupied bandwidth resources and storage resources.

Optionally, after comparison between a snapshot and a snapshot adjacent to the snapshot is completed, the disaster recovery site may delete the snapshot, to save memory space. Certainly, to ensure that a snapshot is available to next backup, the last snapshot may be retained, for example, the third snapshot in this embodiment of this application. This is not specifically limited in this embodiment of this application.

Similarly, second CBT and third CBT are also obtained via a similar method. As shown in FIG. 4, a block 420 records a data block that changes during generation of the second snapshot relative to generation of the first snapshot. To be specific, based on the first CBT, the second CBT records the data block that changes during generation of the second snapshot relative to generation of the first snapshot. Similarly, a block 430 in the third CBT records a data block that changes during generation of the third snapshot relative to generation of the first snapshot. To be specific, based on the second CBT, the third CBT records the data block that changes during generation of the third snapshot relative to generation of the second snapshot. Similarly, "2" on the block 420 and "3" on the block 430 may be respectively used to indicate a version number corresponding to the second snapshot and a version number corresponding to the third snapshot.

In the structure of the CBT information, newly added information of current CBT is recorded based on previous CBT. This reduces used CBT block resources, increases a proportion of useful information in the CBT information, and reduces occupied bandwidth resources and storage resources.

It should be understood that a format of the CBT information shown in FIG. 4 is merely an example. In some implementations, the format of the CBT information may further have a plurality of variations. This is not specifically limited in this embodiment of this application.

It should be understood that a sequence of performing steps S340 and S350 is not specifically limited in this embodiment of this application.

In step 360, the disaster recovery site sends a first message to the production site, and sends the generated CBT information to the production site.

In step 370, the production site resumes running based on the received CBT information and the first backup copy. The first backup copy may be a backup copy in the local storage server, or may be a backup copy obtained from another third-party device.

Specifically, when the CBT information is in the format shown in FIG. 4, the production site needs to calculate a difference between the CBT to obtain difference information between the CBT. The production site may resume production based on the obtained difference information and the first backup copy.

Figure 5:
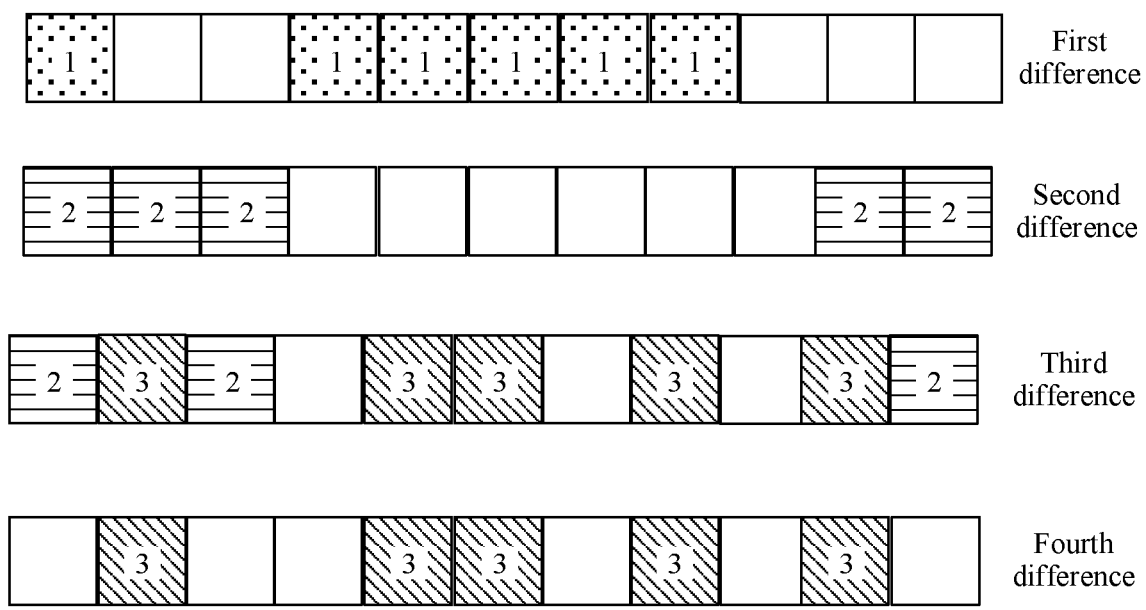
FIG. 5 is a schematic structural diagram of a difference between CBT according to an embodiment of this application.

For ease of understanding, the following describes, with reference to FIG. 5, a process in which the production site obtains the difference information between the CBT.

Because the first CBT is difference information between a version corresponding to the first snapshot and a version corresponding to the zero$^{th}$ snapshot, the difference information does not need to be calculated for the first CBT. For ease of description, the first CBT is denoted as a first difference. After running based on the first backup copy, the production site may recover, based on the first difference, the version corresponding to the first snapshot, that is, recover new data generated when the disaster recovery site generates the first snapshot. A second difference shown in FIG. 5 is a difference between the second CBT and the first CBT, and is actually a difference between a version corresponding to the second snapshot and the version corresponding to the first snapshot. After recovering the version corresponding to the first snapshot, the production site may recover, based on the second difference, new data generated when the second snapshot is generated. A third difference shown in FIG. 4 is a difference between the third CBT and the first CBT, and is actually a difference between a version corresponding to the third snapshot and the version corresponding to the first snapshot. A fourth difference shown in FIG. 5 is a difference between the third CBT and the second CBT, and is actually a difference between the version corresponding to the third snapshot and the version corresponding to the second snapshot. Therefore, the version corresponding to the third snapshot may be recovered based on the version corresponding to the first snapshot and the third difference or the version corresponding to the second snapshot and the fourth difference. This is not specifically limited in this embodiment of this application.

It should be understood that the foregoing version may be understood as a version based on which the disaster recovery site runs at a snapshot moment.

It should be further understood that, if the CBT information is in a format different from the format shown in FIG. 4, a method for resuming running by the production site is also different. This is not specifically limited in this embodiment of this application.

In steps S310 to S370, the disaster recovery site in the heterogeneous system can transmit the incremental data to the production site, so that the production site restores the service. Certainly, the methods shown in FIG. 2 to FIG. 5 are merely examples, and should not be construed as a limitation on this application.

The foregoing describes the disaster recovery method provided in the embodiments of this application. The following describes a production site and a disaster recovery site provided in embodiments of this application.

Figure 6:
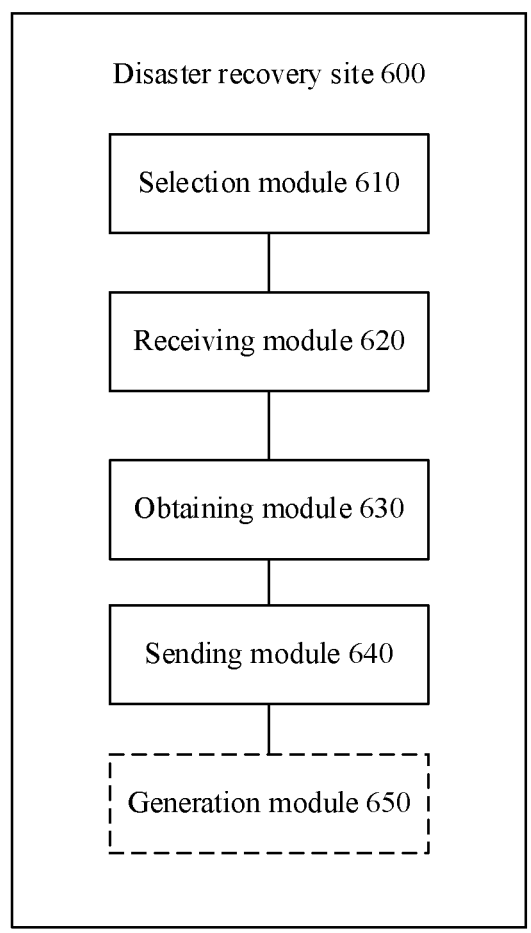
FIG. 6 is a schematic block diagram of a disaster recovery site according to an embodiment of this application.

FIG. 6 is a schematic block diagram of a disaster recovery site 600 according to an embodiment of this application. The disaster recovery site 600 includes: a selection module 610, configured to select a first backup copy when taking over a service of a production site; a receiving module 620, configured to receive service data through a virtual machine; an obtaining module 630, configured to obtain changed block tracking CBT information based on a CBT technology and the received service data, where the CBT information includes incremental information generated after the disaster recovery site receives the first backup copy; and a sending module 640, configured to send a first message to the production site, where the first message includes the CBT information. A storage server in the disaster recovery site and a storage server in the production site are heterogeneous devices.

Optionally, the disaster recovery device 600 may further include a generation module 650, configured to generate N snapshots, where N is greater than or equal to 2. The obtaining module is further configured to obtain difference information between each of the N snapshots and a previous snapshot of each of the N snapshots, where the CBT information includes the difference information.

Optionally, the CBT information includes CBT corresponding to each of the N snapshots, the Nth snapshot corresponds to Nth CBT, and the Nth CBT includes difference information between each of the first N−1 snapshots and a previous snapshot of each of the first N−1 snapshots.

Optionally, the obtaining module is further configured to delete the first N−1 snapshots and retain the N$^{th}$ snapshot.

Figure 7:
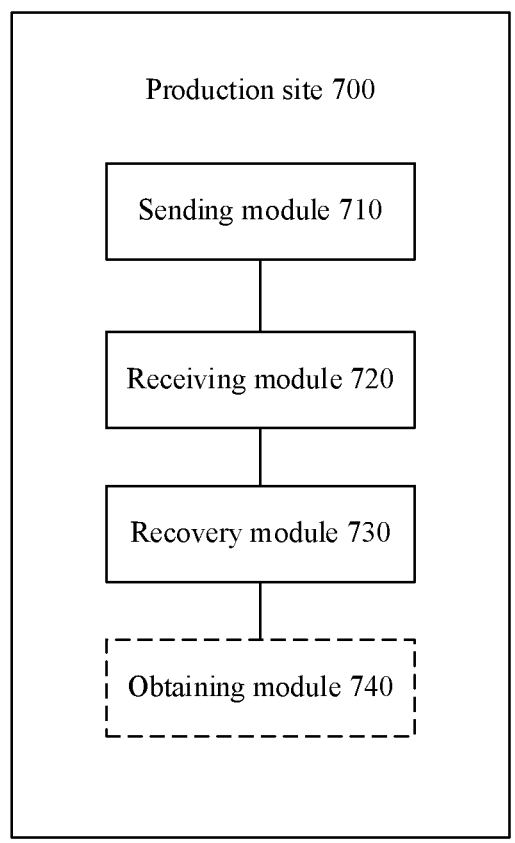
FIG. 7 is a schematic block diagram of a production site according to an embodiment of this application.

FIG. 7 is a schematic block diagram of a production site 700 according to an embodiment of this application. The production site 700 includes:

a sending module 710, configured to send a first backup copy to a disaster recovery site, so that the disaster recovery site takes over a service of the production site 700; a receiving module 720, configured to receive a first message sent by the disaster recovery site, where the first message includes CBT information, and the CBT information includes incremental information generated since the disaster recovery site takes over the service of the production site; and a recovery module 730, configured to restore the service based on the first backup copy and the CBT information.

Optionally, the CBT information includes N CBT, where N is greater than or equal to 1. The production site 700 further includes an obtaining module 740, configured to obtain a difference between the CBT. The recovery module is further configured to restore the service based on the first backup copy and the difference between CBT backups.

It should be understood that the production site or the disaster recovery site provided in this embodiment of this application may be a set of a plurality of physical devices, or may be an independent physical device. This is not specifically limited in this embodiment of this application.

In the embodiments of this application, a terminal site or a network site includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of the method provided in the embodiment of this application is not specifically limited in the embodiments of this application, provided that a program that records code of the method provided in the embodiment of this application can be run to perform communication according to the method provided in the embodiment of this application. For example, the execution body of the method provided in the embodiment of this application may be the terminal site or the network site, or a functional module that can invoke and execute the program in the terminal site or the network site.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD) or a digital versatile disc (DVD), a smart card and a flash memory component (for example, erasable programmable read-only memory EPROM), a card, a stick, or a key drive). In addition, various storage media described in this specification may indicate one or more sites and/or other machine-readable media that are configured to store information. The term "machine-readable media" may include but is not limited to a radio channel, and various other media that can store, contain, and/or carry an instruction and/or data.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate parts may or may not be physically separate, and parts displayed as units may or may not be physical units, may be located in one position, or may be distributed to a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer site (which may be a personal computer, a server, or a network site) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data disaster recovery method, wherein the method is applied to a disaster recovery system, the disaster recovery system comprises a production site and a disaster recovery site, and the method comprises:
    selecting, by the disaster recovery site, a first backup copy when taking over a service of the production site;
    receiving service data;
    obtaining changed block tracking (CBT) information based on the received service data by generating N snapshots and obtaining difference information between each of the N snapshots and a previous snapshot of each of the N snapshots, wherein N is greater than or equal to 2 and the CBT information comprises the difference information, wherein the CBT information comprises incremental information generated after the disaster recovery site receives the first backup copy; and
    sending, by the disaster recovery site, a first message to the production site, wherein the first message comprises the CBT information; wherein
    a storage server in the disaster recovery site and a storage server in the production site are heterogeneous devices.

2. The method according to claim 1, wherein the CBT information comprises CBT information corresponding to each of the N snapshots, an $N^{th}$ snapshot corresponds to $N^{th}$ CBT information, and the $N^{th}$ CBT information comprises difference information between each of first N−1 snapshots and a previous snapshot of each of the first N−1 snapshots.

3. The method according to claim 1, wherein after the obtaining difference information between each of the N snapshots and a previous snapshot of each of the N snapshots, the method further comprises:
    deleting the first N−1 snapshots, and retaining the $N^{th}$ snapshot.

4. A disaster recovery site, wherein the disaster recovery site comprises:
    a memory storing instructions; and
    a processor coupled to the memory to execute the instructions to:
    select a first backup copy when taking over a service of a production site;
    receive service data;
    obtain changed block tracking (CBT) information based on the received service data by generating N snapshots and obtaining difference information between each of the N snapshots and a previous snapshot of each of the N snapshots, wherein N is greater than or equal to 2 and the CBT information comprises the difference information, wherein the CBT information comprises incremental information generated after the disaster recovery site receives the first backup copy; and
    send a first message to the production site, wherein the first message comprises the CBT information; and wherein a storage server in the disaster recovery site and a storage server in the production site are heterogeneous devices.

5. The disaster recovery site according to claim 4, wherein the CBT information comprises CBT information corresponding to each of the N snapshots, an $N^{th}$ snapshot corresponds to $N^{th}$ CBT information, and the $N^{th}$ CBT information comprises difference information between each of first N−1 snapshots and a previous snapshot of each of the first N−1 snapshots.

6. The disaster recovery site according to claim 5, wherein after the obtaining difference information between each of the N snapshots and a previous snapshot of each of the N snapshots, the method further comprises:
  deleting, by the disaster recovery site, the first N−1 snapshots, and retaining the $N^{th}$ snapshot.

* * * * *

UNITED STATES PATENT AND TRADEMARK OFFICE
CERTIFICATE OF CORRECTION

PATENT NO. : 11,947,429 B2
APPLICATION NO. : 17/211906
DATED : April 2, 2024
INVENTOR(S) : Wenjun Yang It is certified that error appears in the above-identified patent and that said Letters Patent is hereby corrected as shown below:

In the Claims

In Column 15, Line 11, in Claim 6, delete "claim 5," and insert -- claim 4, --.

Signed and Sealed this
Eighteenth Day of June, 2024

Katherine Kelly Vidal
*Director of the United States Patent and Trademark Office*